US011628885B2

United States Patent
Nishio

(10) Patent No.: US 11,628,885 B2
(45) Date of Patent: Apr. 18, 2023

(54) VEHICLE-BODY STRUCTURE OF VEHICLE

(71) Applicant: MAZDA MOTOR CORPORATION, Hiroshima (JP)

(72) Inventor: Nobuya Nishio, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 1 day.

(21) Appl. No.: 17/469,660

(22) Filed: Sep. 8, 2021

(65) Prior Publication Data

US 2022/0153351 A1 May 19, 2022

(30) Foreign Application Priority Data

Nov. 17, 2020 (JP) .............................. JP2020-191011

(51) Int. Cl.
*B62D 21/15* (2006.01)
*B60R 19/34* (2006.01)
*B60R 19/26* (2006.01)
*B60R 19/02* (2006.01)
*B60R 19/38* (2006.01)
(Continued)

(52) U.S. Cl.
CPC ............ *B62D 21/152* (2013.01); *B60R 19/34* (2013.01); *B60R 19/02* (2013.01); *B60R 19/023* (2013.01); *B60R 19/26* (2013.01); *B60R 19/38* (2013.01); *B60R 2019/266* (2013.01);
(Continued)

(58) Field of Classification Search
CPC ....... B60R 19/02; B60R 19/023; B60R 19/24; B60R 19/26; B60R 19/34; B60R 19/38; B60R 2019/266; B62D 21/00; B62D 21/15; F16B 43/00; F16B 41/002

USPC ....... 293/102, 108, 120, 121, 132, 142, 155; 296/133; 188/376
See application file for complete search history.

(56) References Cited

U.S. PATENT DOCUMENTS

| 3,697,108 A * | 10/1972 | Diener | .................... B60R 19/36 |
| | | | 293/133 |
| 2016/0137230 A1* | 5/2016 | Tan | ...................... B62D 25/085 |
| | | | 296/193.09 |

FOREIGN PATENT DOCUMENTS

| JP | 2015-151021 A | 8/2015 | |
| JP | 2018-131152 A | 8/2018 | |
| KR | 20030045512 A * | 6/2003 | ............. B60R 19/26 |

OTHER PUBLICATIONS

Lee, "The Shock Absorbing Structure of The Front Side Member", Published: Jun. 11, 2003, Publisher: Korean Patent Office, Edition: KR20030045512A (Year: 2003).*

(Continued)

*Primary Examiner* — Dennis H Pedder
*Assistant Examiner* — Joyce Eileen Hill
(74) *Attorney, Agent, or Firm* — Studebaker & Brackett PC

(57) ABSTRACT

A vehicle-body structure of a vehicle of the present invention comprises a bumper support portion provided at a vehicle body of the vehicle to support to bumper, a connection portion connecting the bumper and the bumper support portion and supporting the bumper, and a slide allowance portion configured to allow the bumper to slide in a vehicle longitudinal direction relative to the bumper support portion when a longitudinal load having a specified magnitude or larger is applied to the bumper from a vehicle outside, wherein the connection portion is provided on an upper face of the bumper support portion, and the slide allowance (Continued)

portion is configured to allow the longitudinal sliding of the bumper independently from the supporting of the bumper by the connection portion.

19 Claims, 11 Drawing Sheets

(51) Int. Cl.
*F16B 43/00* (2006.01)
*F16B 41/00* (2006.01)
(52) U.S. Cl.
CPC ............ *B62D 21/15* (2013.01); *F16B 41/002* (2013.01); *F16B 43/00* (2013.01)

(56) References Cited

OTHER PUBLICATIONS

European Patent Office, "European Search Opinion", dated Mar. 18, 2022, European Patent Office, Patent Application No. 21207694.7-1132 (Year: 2022).*

* cited by examiner

VEHICLE-BODY STRUCTURE OF VEHICLE

BACKGROUND OF THE INVENTION

The present invention relates to a vehicle-body structure of a vehicle, and in particular relates to the vehicle-body structure of the vehicle which comprises a bumper, a bumper support portion provided at a vehicle body of the vehicle, and a connection portion connecting the bumper and the bumper support portion and supporting the bumper.

Conventionally, in a front bumper which is provided at a vehicle front face, a structure to reduce collision impact applied to a pedestrian for the purpose of pedestrian protection has been developed. For example, Japanese Patent Laid-Open Publication No. 2015-151021 proposes such a structure in which a notch hole which is opened toward a vehicle forward side is formed at an attachment portion of an upper portion of a front bumper to a vehicle body and the front bumper is fixed to the vehicle body by inserting a bolt/nut as a fixation member into the notch hole and fastening that to the vehicle body, wherein the attachment portion of the upper portion of the front bumper is configured to slide forwardly when impact which exceeds a fastening force of the above-described fixation member is applied to the front bumper from a vehicle forward side, thereby dropping the front bumper from the vehicle body.

Herein, Japanese Patent Laid-Open Publication No. 2018-131152 discloses a structure in which a forward detecting device, such as a radar, is attached to a front grille, a front bracket to support the front grille and a rear bracket fixed at a vehicle-body side are provided, each of these brackets is a flat-plate shaped member which extends in a vertical direction so as to support the front grille, and one of these brackets has a notch hole or the like and the other bracket has a projection which is capable of fitting into this notch hole or the like, whereby the both brackets are fixed together. In this structure, in a minor front collision, i.e., in a front collision where the front grille is deformed in such a manner that the detection performance (accuracy) of the forward detection device is deteriorated, the position of the front bracket which has been moved rearwardly can be returned to its original position, thereby maintaining the detection performance (accuracy) of the forward detection device properly.

However, according to the structure disclosed in the above-described first patent document, since a sliding load (a load which starts to cause sliding by the collision, which exceeds a frictional force by the bolt fastening) is adjusted by controlling the frictional force depending on the bolt fastening force in order to absorb the impact by making the front bumper slide forwardly, there is a problem in a large-sized vehicle, such as SUV that the support rigidity of the front bumper and the impact absorption performance may not be compatibly attained properly.

That is, since the weight of the front bumper of the large-sized vehicle, such as SUV, is heavy, in a case where the structure disclosed in the above-described first patent document is applied, it is necessary to increase the bolt fastening force in order to secure the support rigidity of the front bumper. Meanwhile, since the frictional force increases due to the increase of the fastening force, it becomes difficult to make the front bumper slide in the collision. Therefore, if the fastening force is weakened in order to control adjusting of the sliding load, the support rigidity of the bumper decreases, so that there is a concern that the front bumper may drop off or the like. Thus, the structure disclosed in the first patent document has the problem that the support rigidity of the front bumper and the impact absorption performance may not be compatibly attained. This problem may occur in a case where the impact reduction structure is applied to a rear bumper provided at a vehicle rear portion as well.

SUMMARY OF THE INVENTION

The present invention has been devised in view of the above-described problem, and an object of the present invention is to provide a vehicle-body structure of a vehicle which can compatibly attain the support rigidity of the bumper and the impact reduction performance for a pedestrian in the collision.

The present invention is the vehicle-body structure of the vehicle which comprises a bumper provided at a front face and/or a rear face of the vehicle, a bumper support portion provided at a vehicle body of the vehicle to support the bumper, a connection portion connecting the bumper and the bumper support portion and supporting the bumper, and a slide allowance portion configured to allow the bumper to slide in a vehicle longitudinal direction relative to the bumper support portion when a longitudinal load having a specified magnitude or larger is applied to the bumper from a vehicle outside, wherein the connection portion is provided on an upper face of the bumper support portion, and the slide allowance portion is configured to allow the longitudinal sliding of the bumper independently from the supporting of the bumper by the connection portion.

According to the present invention, the support rigidity of the bumper can be increased by supporting the bumper at the upper face of the bumper support portion. Moreover, the bumper can be made to slide in the vehicle longitudinal direction in the collision without improperly affecting the bumper support rigidity by allowing the longitudinal sliding of the bumper independently from the supporting of the bumper by the connection portion. Thus, the present invention can compatibly attain the support rigidity of the bumper and the impact reduction performance for the pedestrian in the collision.

In the present invention, it is preferable that the connection portion be capable of sliding in the vehicle longitudinal direction relative to the bumper support portion, the slide allowance portion comprise a clip member which is capable of sliding in the vehicle longitudinal direction together width the connection portion and a pin member which is fixed to the bumper support portion so as to engage with the clip member, and the clip member be configured such that when the longitudinal load having the specified magnitude or larger is applied to the bumper from the vehicle outside, the engaging of the clip member with the pin member fixed to the bumper support portion is released according to the sliding of the connection portion.

According to this preferred structure, since the clip member is configured such that when the longitudinal load having the specified magnitude or larger is applied to the bumper from the vehicle outside, the engaging of the clip member with the pin member fixed to the bumper support portion is released according to the sliding of the connection portion, the bumper can be made to slide in the vehicle longitudinal direction more securely when the longitudinal load having the specified magnitude or larger is applied.

Further, it is preferable in the present invention that the connection portion be capable of sliding rearwardly or forwardly along the upper face of the bumper support portion, the slide allowance portion comprise a first pin member which is fixed to the connection portion, a second pin member which is fixed to the bumper support portion, and a U-shaped member which has a groove portion capable of engaging with the first pin member and the second pin member, and the U-shaped member be configured such that when the longitudinal load having the specified magnitude or larger is applied to the bumper rearwardly or forwardly from the vehicle outside, deformation of the U-shaped member is caused by an increase of a relative distance between the first pin member and the second pin member according to the sliding of the connection portion, whereby the engaging of the U-shaped member with the second pin member is released.

According to this preferred structure, the impact reduction performance can be secured more properly by releasing the engaging of the U-shaped member with the second pin member fixed to the bumper support portion by using the deformation of the U-shaped member.

Moreover, it is preferable in the present invention that the second pin member be fixed to the bumper support portion on a vehicle forward side of the first pin member, the groove portion of the U-shaped member be opened to the vehicle forward side, the U-shaped member be configured such that when the longitudinal load having the specified magnitude or larger is applied to the bumper rearwardly from the vehicle outside, the U-shaped member is forced to slide rearwardly by receiving a force from the first pin member and deformed so as to be expanded by receiving a force from the second pin member according to the sliding of the connection portion.

According to this preferred structure, releasing of the engaging of the U-shaped member with the second pin member by using the deformation of the U-shaped member can be attained more effectively.

It is also preferable in the present invention that a restriction portion to restrict a forward move and a lateral move, in a vehicle width direction, of the connection portion be provided at the upper face of the bumper support portion.

According to this preferred structure, the bumper can be prevented from being displaced forwardly or laterally by the restriction portion in a normal time (except the collision), so that the support rigidity of the bumper can be secured properly. Meanwhile, in the collision, the bumper can be prevented from being moved in another direction than the rearward direction.

It is also preferable in the present invention that a slant portion which is configured to protrude obliquely upwardly toward a vehicle rearward side and contact the connection portion when the connection portion slides rearwardly by a specified distance be provided at the upper face of the bumper support portion.

According to this preferred structure, the connection portion can be made to slide obliquely upwardly after the connection portion slides along the upper face of the bumper support portion by the specified distance in the collision, so that contacting of the connection portion with the restriction portion is prevented and the sliding distance of the connection portion is secured, thereby reducing the collision impact more properly.

Further, it is preferable in the present invention that the vehicle comprise a crash can which is provided at a tip portion of a front side frame and a bumper reinforcement which is connected to the crash can, and the bumper support portion be located at a position which is upwardly spaced apart from the crash can.

According to this preferred structure, since the bumper support portion is located at the position which is upwardly spaced apart from the crash can, the support rigidity of the bumper can be secured without hindering deformation of the crash can in the collision. Further, the support rigidity of the bumper can be secured without hindering air introduction from the grille provided at a front bumper.

Herein, it is preferable that the vehicle further comprise a bracket to fix the bumper support portion to the bumper reinforcement, and the bumper support portion be provided via the bracket so as to be located at the position which is upwardly spaced apart from the crash can.

Additionally, it is preferable that the bumper support portion be provided with a guide portion which is configured to extend in the vehicle longitudinal direction and guide rearward sliding of the connection portion.

According to this preferred structure, the bumper can be made to slide rearwardly more securely in the collision.

The present invention will become apparent from the following description which refers to the accompanying drawings.

DETAILED DESCRIPTION OF THE INVENTION

Hereafter, a vehicle-body structure of a vehicle according to an embodiment of the present invention will be described referring to the attached drawings.

Figure 1:
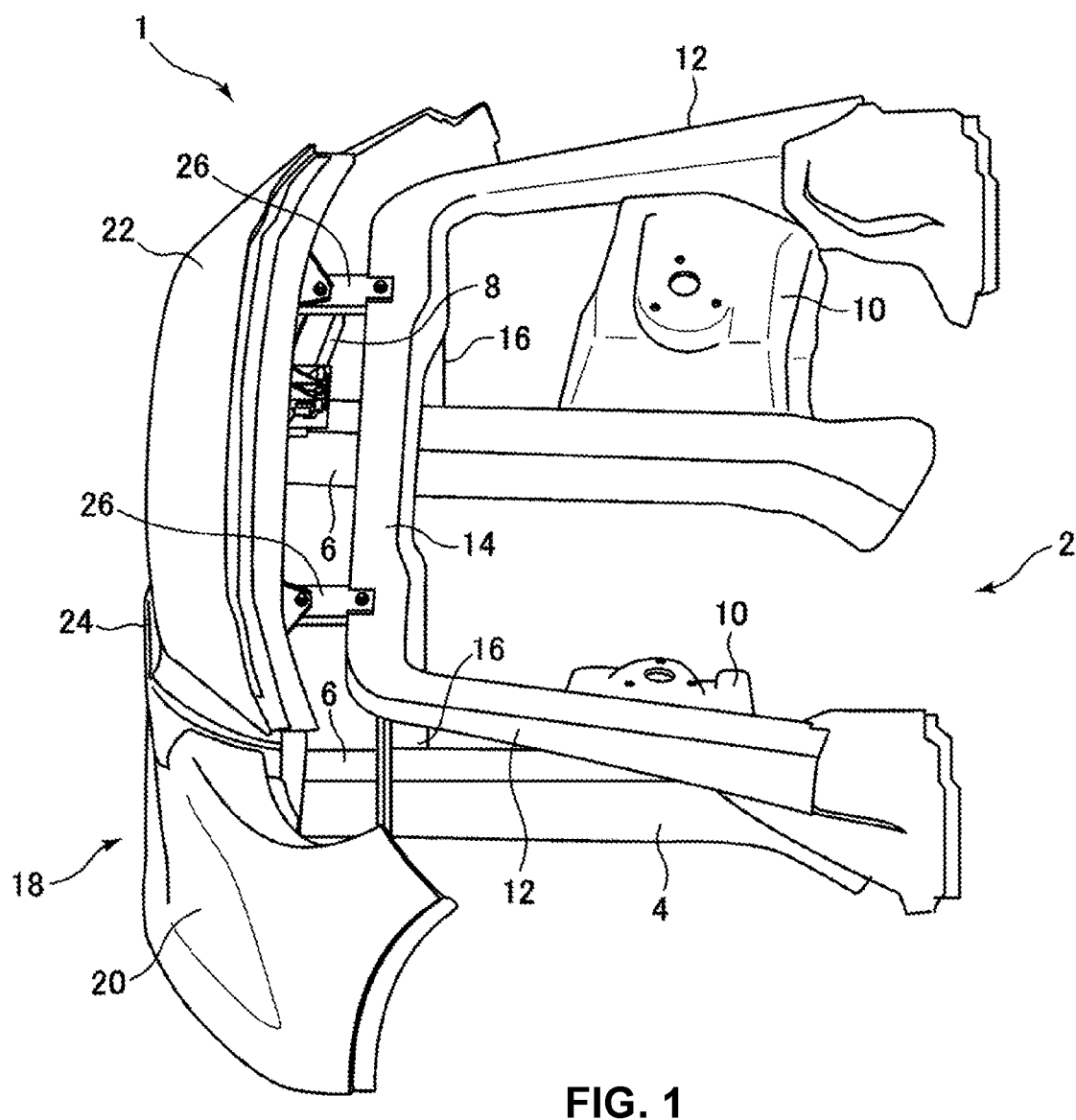
FIG. 1 is a perspective view showing a front portion of a vehicle to which a vehicle-body structure of the vehicle according to an embodiment of the present invention is applied, when obliquely viewed from an upper-left side of the vehicle.

First, a schematic structure of the vehicle-body structure of the vehicle according to the embodiment of the present invention will be described referring to FIG. 1. FIG. 1 is a perspective view showing a front portion of a vehicle to which the vehicle-body structure of the vehicle according to the embodiment of the present invention is applied, when obliquely viewed from an upper-left side of the vehicle.

An engine room 2 where an engine unit, a transmission and others, which are not illustrated, are arranged is provided at a front portion of a vehicle 1 to which the vehicle-body structure of the vehicle according to the embodiment of the present invention is applied. In the embodiment of the present invention, the vehicle-body structure of the vehicle is configured to be basically symmetrical, in a vehicle width direction, of the vehicle.

At the front portion of the vehicle 1 are provided a pair of right-and-left front side frames 4 which extend in a vehicle longitudinal direction at right-and-left both sides of the engine room 2, a pair of right-and-left crash cans/impact absorbing members 6 which are connected to respective tip portions of the front side frames 4, and a bumper reinforcement 8 positioned at a vehicle-body side which is connected to the crash cans 6 and extends in the vehicle width direction. The bumper reinforcement 8 is curved in an arch shape such that both end portions, in the vehicle width direction, thereof are positioned on a rearward side of a central portion, in the vehicle width direction, thereof in a plan view.

A suspension tower 10 is connected to each of the front side frames 4. A pair of right-and-left apron members 12 which extend in the vehicle longitudinal direction at right-and-left both sides of an upper side of the engine room 2 are provided at the front portion of the vehicle 1, and an upper portion of the suspension tower 10 is connected to each of the apron members 12. A front tip portion of each of the apron members 12 is curved inwardly, in the vehicle width direction, in the plan view, and the both tip portions of the apron members 12 are interconnected by a shroud upper member 14. At both end portions of the shroud upper member 14 are provided shroud members 16, each of which respectively connects the shroud upper member 14, the apron member 12, and the front side frame 4 which are located below these members 14, 12 in a vertical direction. A radiator (not illustrated) which cools an engine (not illustrated) by air introduced from a front grille 24, which will be described later, and others are provided in a space which is enclosed by the shroud upper member 14 and the right-and-left shroud members 16.

A bumper face (bumper) 18 is provided at a front face of the vehicle 1. The bumper 18 comprises a bumper-face body portion 20 and a bumper-face upper portion 22. The front grille 24 is provided between the bumper-face body portion 20 and the bumper-face upper portion 22.

The bumper-face upper portion 22 is fixedly supported at the shroud upper member 14 by a pair of right-and-left upper bumper supporting members 26. The upper bumper supporting members 26 are members which perform the function of supporting the bumper 18 so as to control the position of the bumper 18. Meanwhile, right-and-left both sides, in the vehicle width direction, of the bumper-face body portion 20 are supported via respective bumper-support structural bodies 30, which will be described later, so as to slide relatively to the bumper reinforcement 8 positioned at the vehicle-body side (see FIG. 3).

Figure 2:
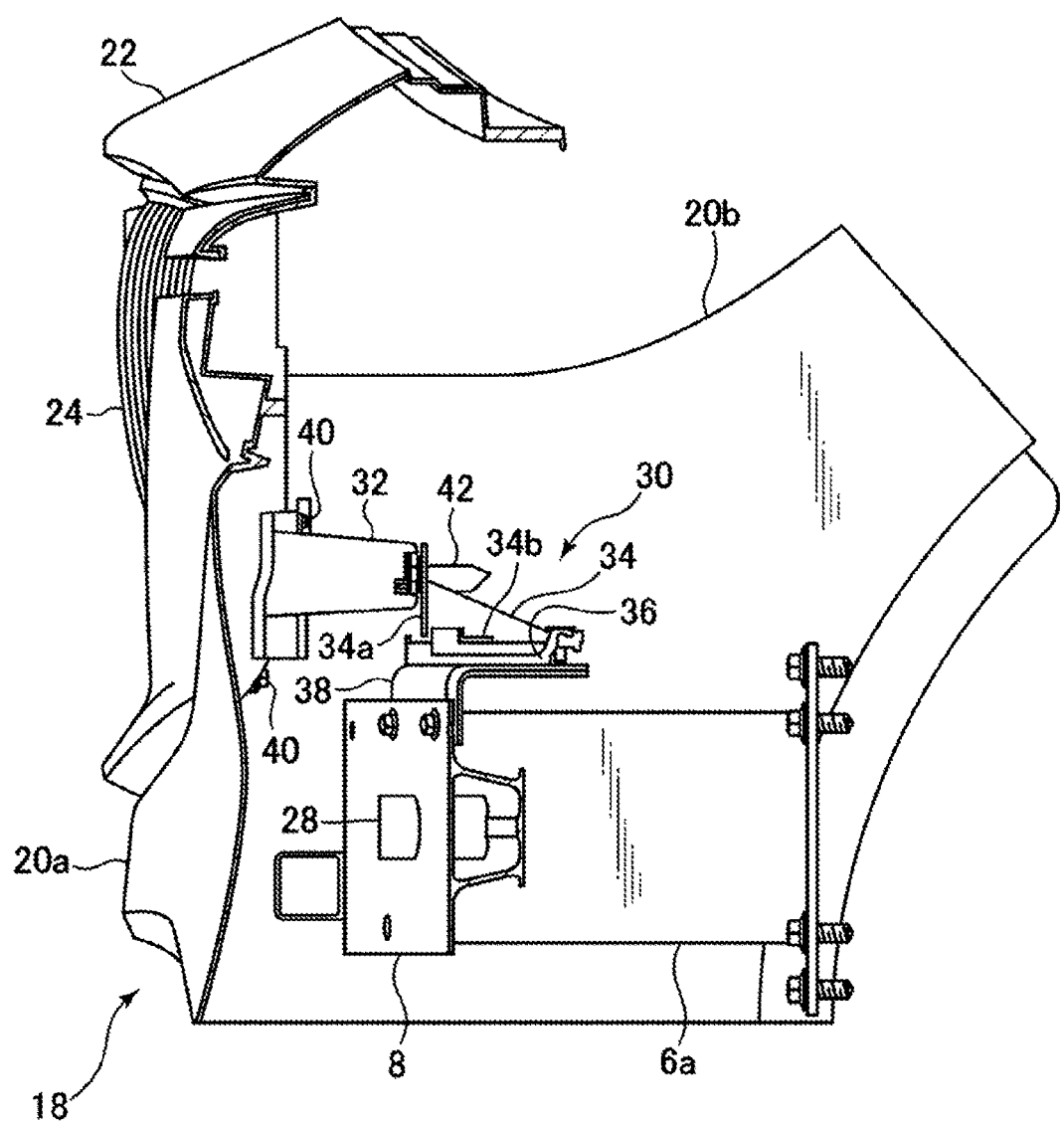
FIG. 2 is a partial sectional side view of a bumper support structure according to the present embodiment, when viewed from a vehicle left side.
Figure 5:
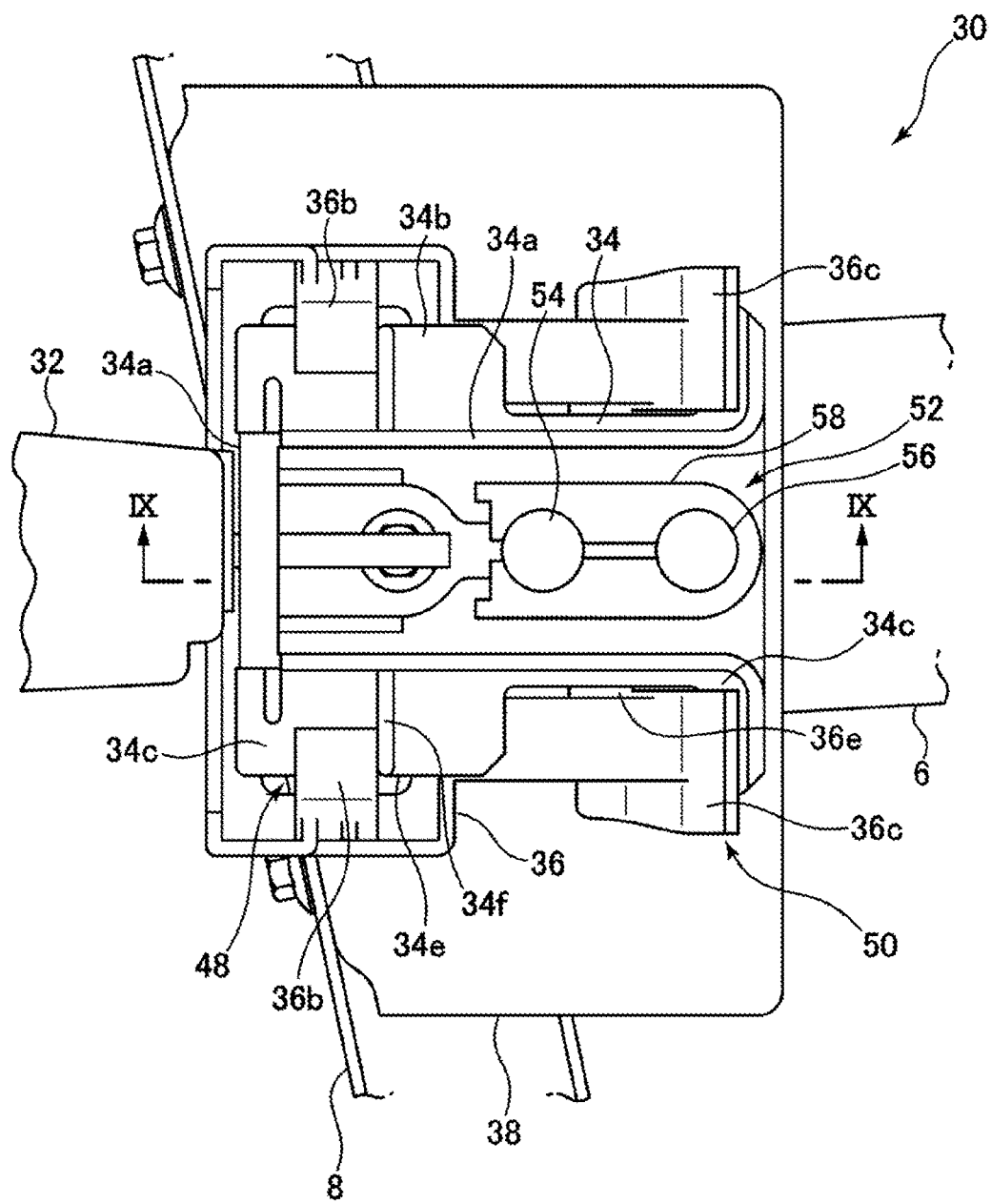
FIG. 5 is a plan view of the bumper support structure of the present embodiment, when viewed from a vehicle upper side.
Figure 6:
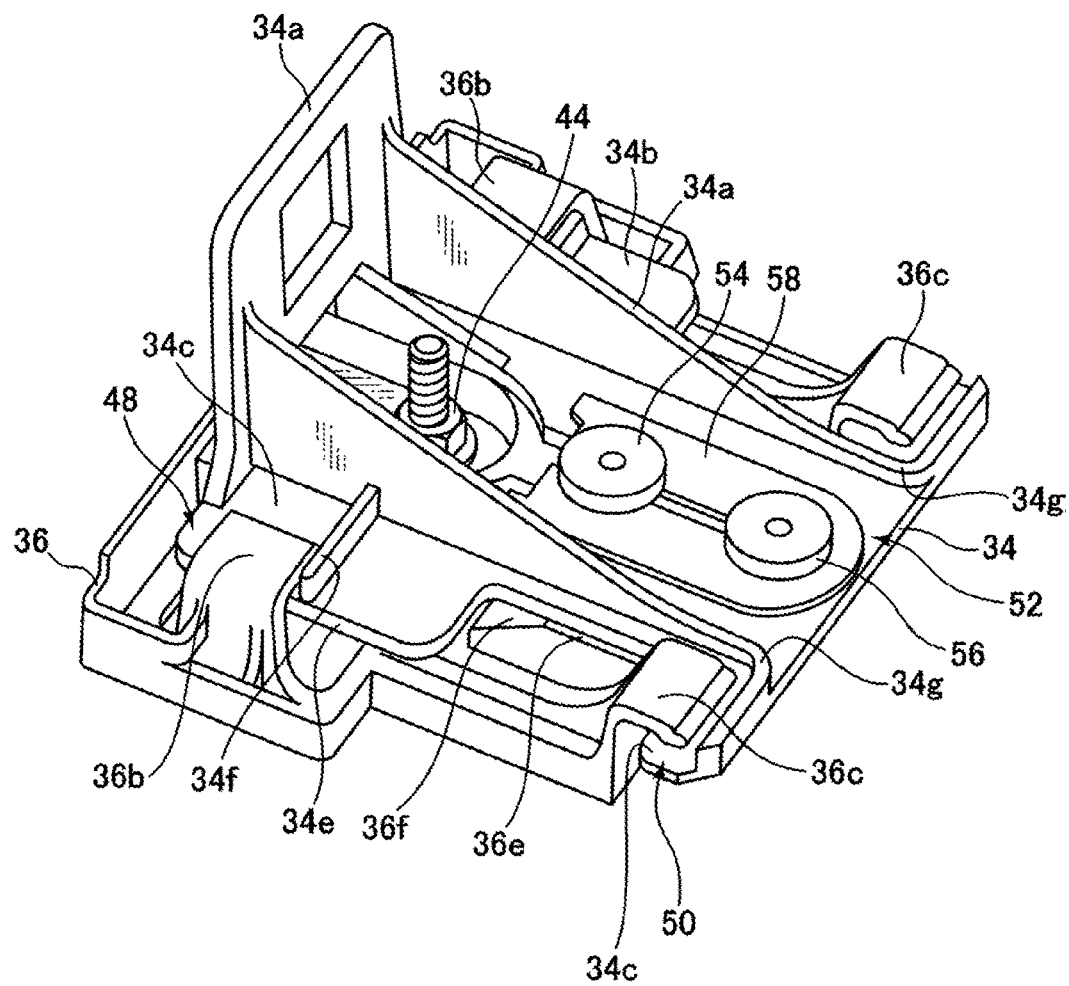
FIG. 6 is a perspective view showing a connecting member, a bumper supporting member, and a slide allowing mechanism of the bumper support structure according to the present embodiment.
Figure 7:
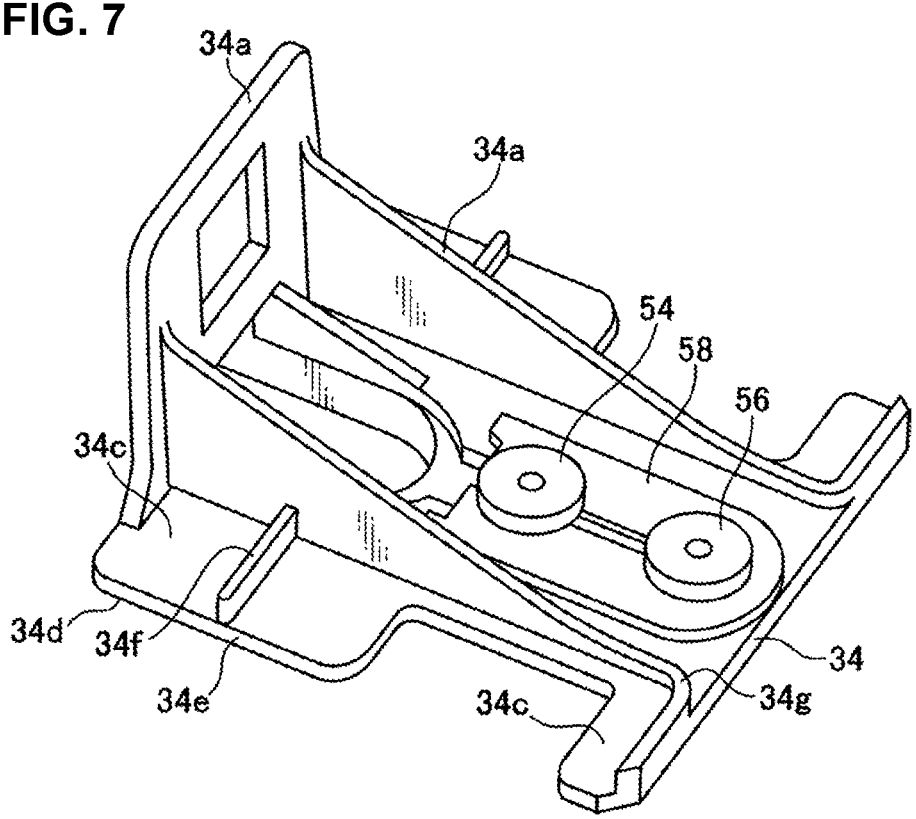
FIG. 7 is a perspective view of the connecting member and the slide allowing mechanism of the bumper support structure according to the present embodiment.
Figure 8:
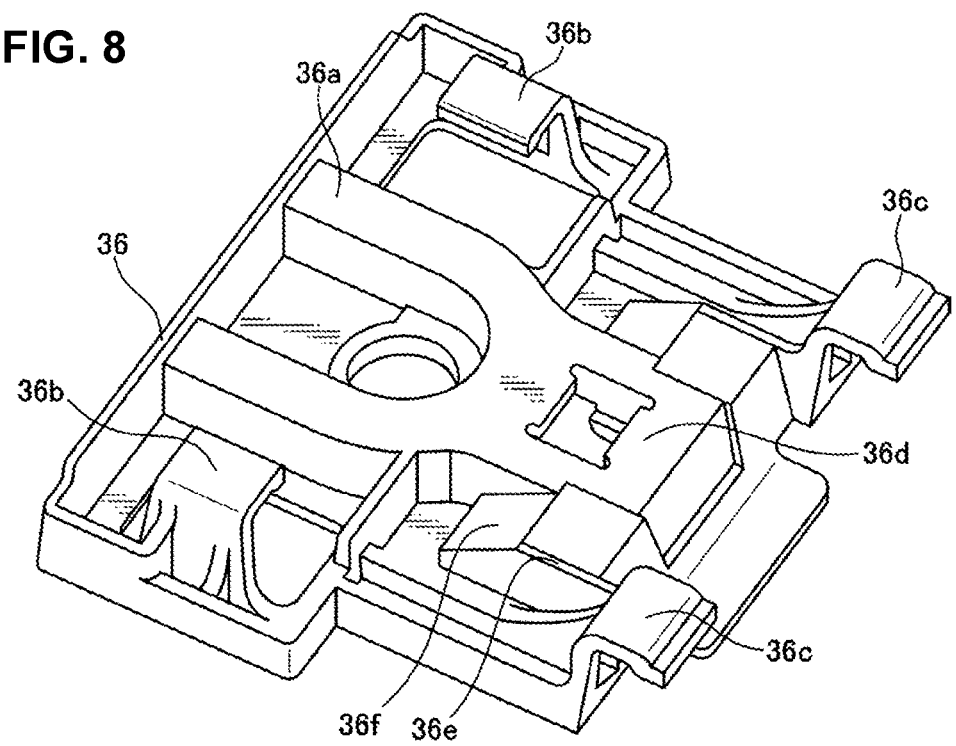
FIG. 8 is a perspective view showing the bumper supporting member of the bumper support structure according to the present embodiment.
Figure 9:
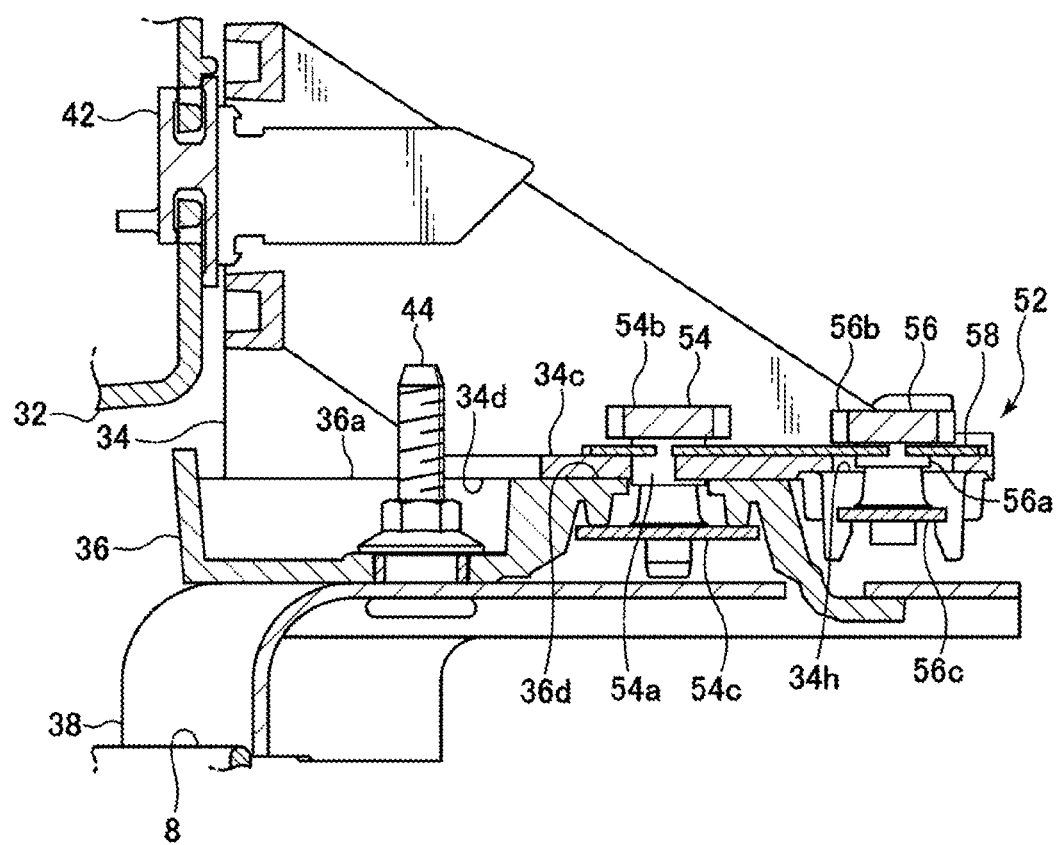
FIG. 9 is a sectional view taken along line IX-IX of FIG. 5, which shows a fixation structure of the connection member to the bumper supporting member and a structure of the slide allowing mechanism according to the bumper support structure.

Next, a schematic structure of a bumper support structure of the vehicle-body structure of the vehicle according to the embodiment of the present invention will be described referring to FIGS. 2 through 9. FIG. 2 is a partial sectional side view of the bumper support structure according to the present embodiment, when viewed from a vehicle left side, FIG. 3 is a sectional view taken along a vertical face of the center, in a vehicle width direction, of the bumper support structure shown in FIG. 2, FIG. 4 is a partial enlarged perspective view showing the bumper support structure at the front portion of the vehicle according to the vehicle-body structure of the vehicle of the present embodiment, when viewed from an upper left-rear side of the vehicle, FIG. 5 is a plan view of the bumper support structure of the present embodiment, when viewed from a vehicle upper side, FIG. 6 is a perspective view showing a connecting member, a bumper supporting member, and a slide allowing mechanism of the bumper support structure according to the present embodiment, FIG. 7 is a perspective view of the connecting member and the slide allowing mechanism of the bumper support structure according to the present embodiment, FIG. 8 is a perspective view showing the bumper supporting member of the bumper support structure according to the present embodiment, and FIG. 9 is a sectional view taken along line IX-IX of FIG. 5, which shows a fixation structure of the connection member to the bumper supporting member and a structure of the slide allowing mechanism of according to the bumper support structure.

Figure 3:
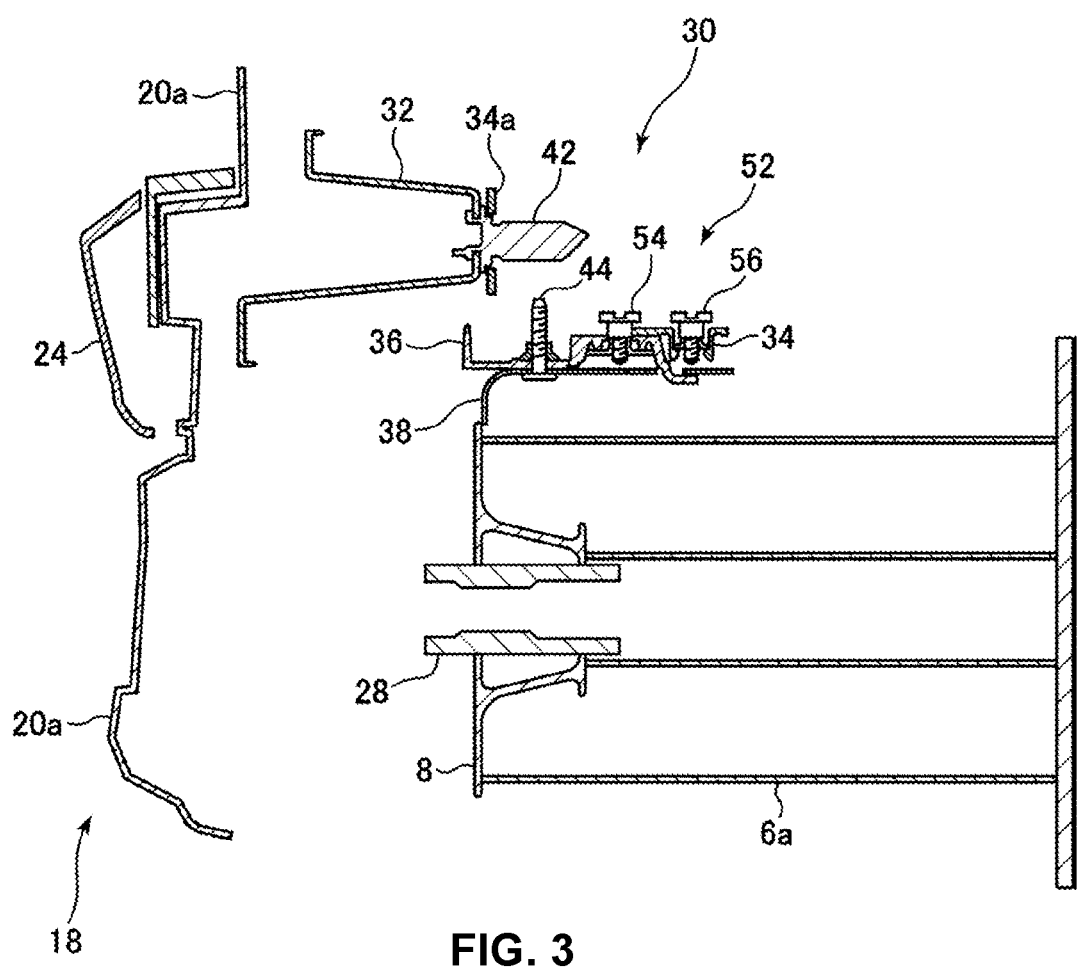
FIG. 3 is a sectional view taken along a vertical face of a center, in a vehicle width direction, of the bumper support structure shown in FIG. 2.

First, as shown in FIGS. 2 and 3, a left-side part 20a, in the vehicle width direction, of the bumper-face body portion 20 is fixedly supported at the bumper reinforcement 8 by the bumper-support structural body 30. The position of this fixation support is located adjacently to a connection portion of a left-side crash can 6a. In the figures, reference character 28 denotes an attaching member by which a left-side part of the bumper reinforcement 8 is attached to the crash can 6a, and reference character 20b denotes a right-side part of the bumper-face body portion 20.

Herein, while FIGS. 2 through 5 show the left-side bumper-support structural body 30, the bumper-face body portion 20b is fixedly supported at the bumper reinforcement 8 by the similar bumper-support structural body (30) in the vehicle right-side part as well. Since the both-side bumper-support structural bodies 30 of the embodiment of the present invention are configured to be laterally symmetrical, the left-side bumper-support structural body 30 will be described and description of the right-side bumper-support structural body 30 is omitted here. Further, a rear bumper provided at a rear face of the vehicle 1 (not illustrated) may be fixedly supported via a structure which is similar to the bumper-support structural body 30 of the present embodiment for reducing impact when an obstacle hits against the rear bumper from a vehicle rearward side. In this case, the rear bumper is fixedly supported at a rear-bumper reinforcement (not illustrated) provided at a vehicle rear part.

Figure 4:
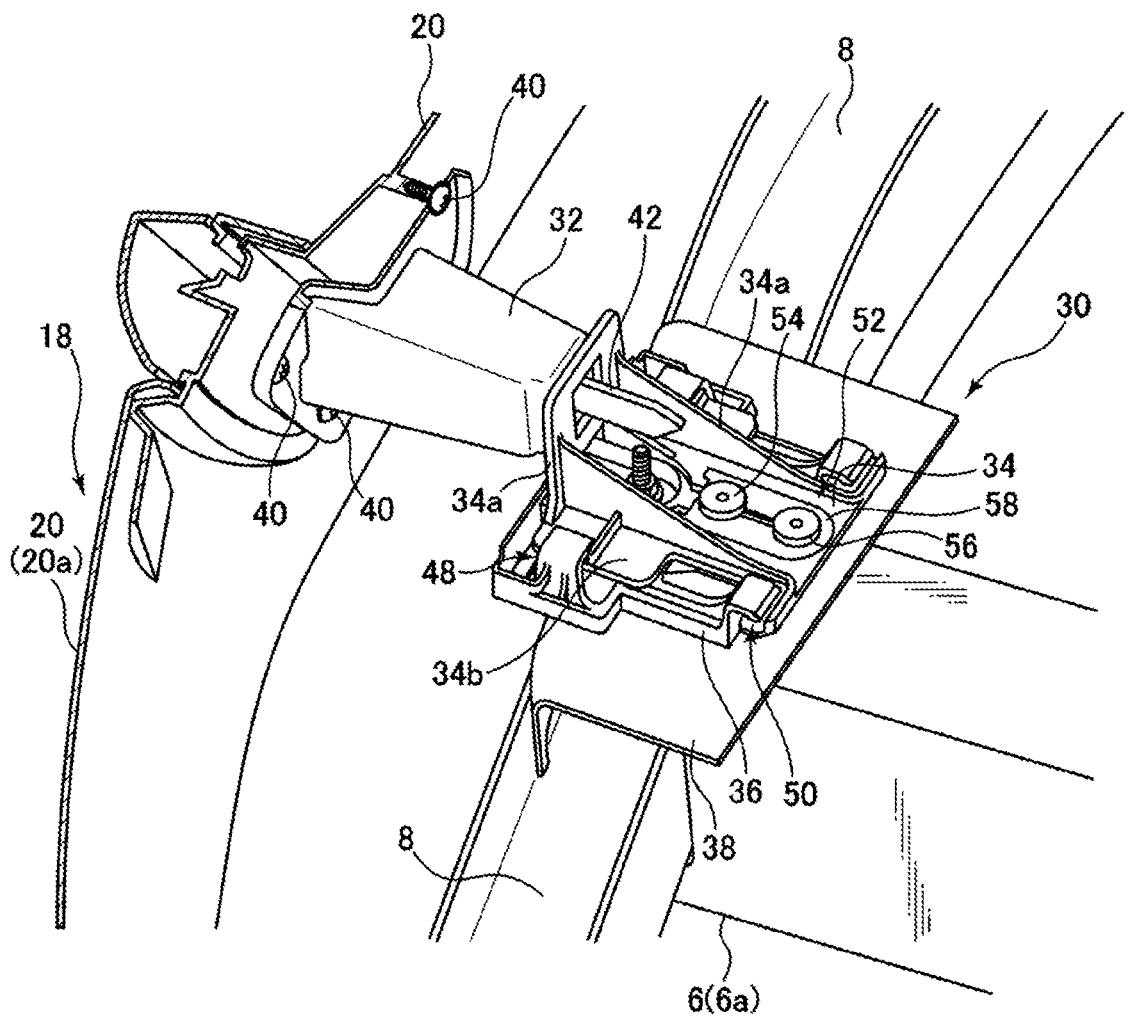
FIG. 4 is a partial enlarged perspective view showing the bumper support structure at the front portion of the vehicle according to the vehicle-body structure of the vehicle of the present embodiment, when viewed from an upper left-rear side of the vehicle.

Next, as shown in FIGS. 2 through 4, the bumper-support structural body 30 is provided between the bumper 18 and the bumper reinforcement 8, and comprises a bumper fixing member 32, a connecting member 34, a bumper supporting member 36, and a bumper supporting bracket 38, which are positioned in order from a side of the bumper 18.

As shown in FIGS. 2 through 4, the bumper fixing member 32 is configured to have a cone-shaped cross section so as to have high rigidity itself. This bumper fixing member 32 is fixed to the bumper-face body portion 20 by fixation members (bolts) 40. Meanwhile, a rear end portion of the bumper fixing member 32 is fixed to the connecting member 34 by a fixation member (clip member) 42 (see FIG. 9). Herein, the bumper fixing member 32 and the connecting member 34 may be formed integrally as a connection portion of the present invention.

Next, as shown in FIGS. 2 and 4 through 7, the connecting member 34 comprises a load reception portion 34a which the bumper fixing member 32 is fixed to and includes a reinforcement portion which is of a triangular shape in a side view and a slide flat-face portion 34b which extends along an upper face of the bumper supporting member 36. A fixation face of the bumper fixing member 32 of the load reception portion 34a extends in the vehicle vertical direction.

As shown in FIGS. 4 and 6 through 9, a bottom face 34d (see FIGS. 7 and 9) of the connecting member 34 contacts an upper face 36a (see FIGS. 8 and 9) of the bumper supporting member 36, whereby the bumper 18 is supported at the upper face 36a of the bumper supporting member 36. Further, the bottom face 34d of the connecting member 34 contacts the upper face 36a of the bumper supporting member 36 so that the connecting member 34 can slide relative to the bumper supporting member 36.

Herein, the bumper fixing member 32 and the connecting member 34 are a connection portion to support the bumper 18 at the upper face 36a of the bumper supporting member 36 and also a connection portion to fix the bumper 18 at the vehicle-body side so that the bumper 18 can slide.

Next, as shown in FIGS. 2 through 5, the bumper supporting member 36 is fixed to the bumper reinforcement 8 by the bumper supporting bracket 38. The bumper supporting bracket 38 is a flat plate member which is configured to have an L-shaped cross section, and one of its flat plate portion which is of an L shape is fixed to a bottom face of the bumper supporting member 36 and the other flat plate portion is fixed to a flange portion of the bumper reinforcement 8 which is configured to have an H-shaped cross section by bolt fastening (see FIGS. 2 and 4). As shown in FIGS. 2 through 4, the bumper supporting member 36 is located at a position which is upwardly spaced apart from the crash can 6 by the above-described bumper supporting bracket 38. Herein, as a modified example, the bumper supporting member 36 and the bumper supporting bracket 38 may be formed integrally as a bumper support portion of the present invention such that the upper face 36a of the bumper support portion is located at the position which is upwardly spaced apart from the crash can 6. The bumper supporting member 36 is fixed to the bumper supporting bracket 38 by a fixation member (clip member) 44 as shown in FIGS. 3 and 9.

Next, as shown in FIGS. 4 through 8, restriction portions 48, 50 to restrict a forward move and a lateral move, in the vehicle width direction, of the connecting member 34 are provided at the connecting member 34 and the bumper supporting member 36.

That is, the first restriction portions 48 prevent (restrict) the connecting member 34 from moving in the vehicle width direction by a pair of right-and-left restricting members 36b provided at the bumper supporting member 36 which contact respective side portions 34e of the connecting member 34. Further, the first restriction portions 48 prevent (restrict) the connecting member 34 from moving forwardly by right-and-left ribs 34f provided at the connecting member 34 which contact the respective restricting member 36b. Each of the restricting members 36b is configured to extend in an L shape as a whole such that it rises upwardly from a side edge portion of the bumper supporting member 36 and is bent inwardly, in the vehicle width direction.

Meanwhile, the second restriction portions 50 prevent (restrict) the connecting member 34 from moving in the vehicle width direction by a pair of right-and-left restricting members 36c provided at the bumper supporting member 36 which contact respective ribs 34g continuously extending from reinforcement portions (load reception portions) 34a of the connecting member 34. Further, the second restriction portions 50 prevent (restrict) the connecting member 34 from moving forwardly by respective portions of the ribs 34g which extend in the vehicle width direction which contact the respective restricting members 36c. Each of the restricting members 36c is configured to extend in an L shape as a whole such that it rises upwardly from a rear edge portion of the bumper supporting member 36 and is bent rearwardly.

Next, as shown in FIGS. 4 through 6, the above-described restricting members 36b, 36c of the bumper supporting member 36 function as the supporting members 36b, 36c to support the bumper 18. First, while the supporting member 36b is configured to extend in the L shape as a whole such that it is bent inwardly as described above, this portion of the supporting member 36b which is bent in the vehicle width direction and extends horizontally is configured to contact/engage with part of an upper face 34c of the connecting member 34, thereby restricting an upward move of the connecting member 34. Moreover, while the supporting member 36c is configured to extend in the L shape as a whole such that it is bent rearwardly as described above, this portion of the supporting member 36c which is bent rearwardly and extends horizontally is configured to contact/engage with part of the upper face 34c of the connecting member 34, thereby restricting the upward move of the connecting member 34.

Next, the support function of the bumper 18 by means of the bumper supporting member 36 will be described. First, while a downward load which acts downwardly, in the vehicle vertical direction, due to the weight of the bumper 18 is applied to the connecting member 34, this load is received at the upper face 36a of the bumper supporting member 36, so that the bumper 18 is supported. That is, the upper face 36a of the bumper supporting member 36 has a first support function of the bumper 18.

Secondly, the weight of the bumper 18 and a moment due to a horizontal distance between the bumper 18 (bumper attachment portion 40) and the connecting member 34 are applied to the connecting member 34, so that the connecting member 34 comes to rotationally move upwardly. The supporting members 36b, 36c provided at the bumper supporting member 36 restrict this upward rotational move of the connecting member 34, thereby supporting the bumper 18. That is, the supporting members 36b, 36c has a second support function of the bumper 18.

Thirdly, the bumper 18 is supported by the pair of right-and-left upper bumper supporting members 26 as described above (see FIG. 1).

Figure 10:
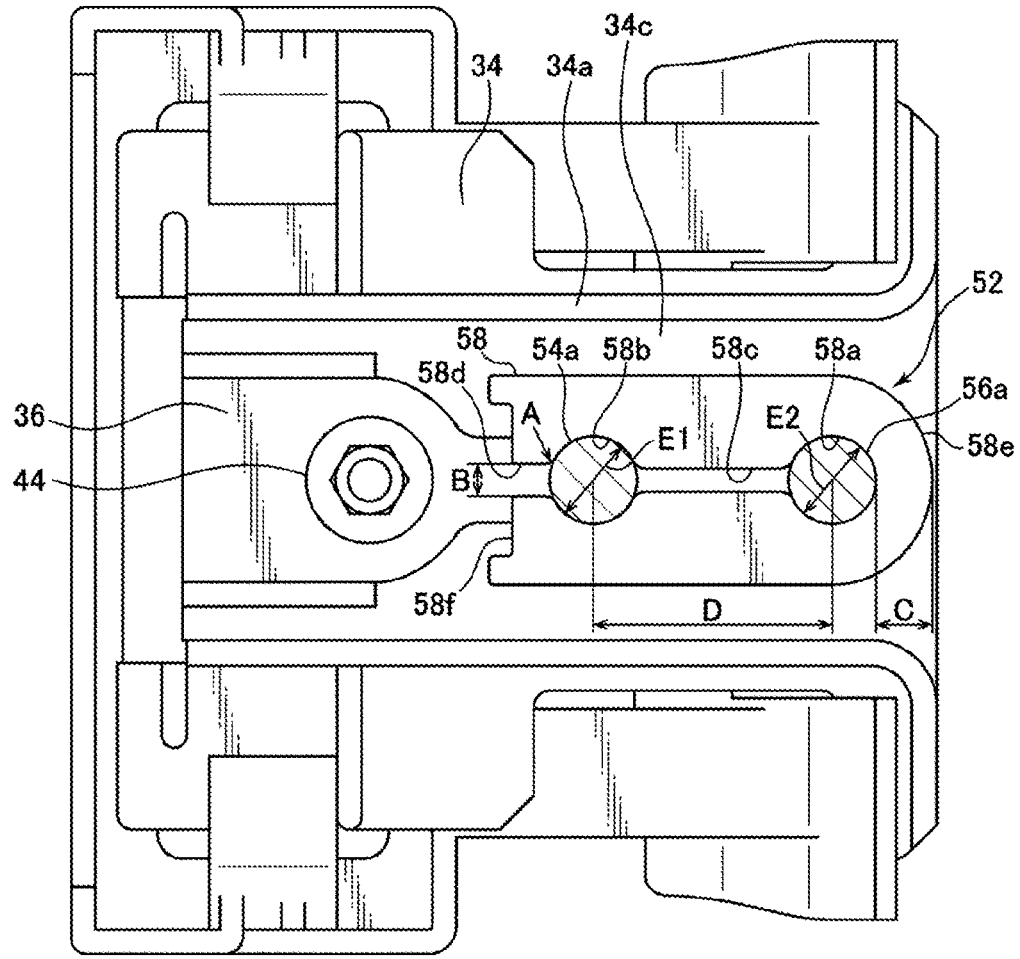
FIG. 10 is a plan view primarily explaining a positional relationship and a dimensional relationship between a flat-plate shaped clip member and pin members of the slide allowing mechanism according to the present embodiment.

Next, a slide allowing mechanism 52 which the bumper-support structural body 30 comprises will be described primarily referring to FIGS. 4 through 10. FIG. 10 is a plan view primarily explaining a positional relationship and a dimensional relationship between a flat-plate shaped clip member and pin members of the slide allowing mechanism according to the present embodiment. In FIG. 10, pin members 54, 56 which will be described later, are illustrated by their cross sections (54a, 56a) which are located at the same level as an upper face of the U-shaped clip member 58. As primarily shown in FIGS. 4 and 5, the bumper-support structural body 30 comprises the slide allowing mechanism 52 which is configured to make the connecting member 34 slide rearwardly relative to the bumper supporting member 36 when a longitudinal load having a specified magnitude or larger is applied to the bumper 18 from a vehicle forward side in the collision.

Herein, the above-described collision longitudinal load having the specified magnitude is appropriately set based on shape, strength and rigidity of the bumper 18, as a whole, and the support rigidity by means of the upper bumper supporting member 26 and the bumper-support structural body 30 so that the collision impact can be reduced and thereby a pedestrian can be protected properly in the collision. The load to be transmitted/inputted to the bumper-support structural body 30 is structurally calculated based on this set load, and then a slide allowance load of the slide allowing mechanism 52, which will be described, is properly set based on this calculated load. Specifically, this slide allowance load is a load (load threshold) which causes engaging of the U-shaped clip member 58 with the front-side pin member 54 to be released, and this load threshold is properly set by adjusting the strength of the U-shaped clip member 58 and the like as described later.

The slide allowing mechanism 52 comprises the front-side pin member (second pin member) 54, the rear-side pin member (first pin member) 56, and the U-shaped clip member (clip member, U-shaped member) 58 which engages with these pin members 54, 56.

The front-side pin member 54 is a member having the strength which is large enough to deform the U-shaped clip member 58. That is, the front-side pin member 54 is made of steel, stainless steel, or high-strength resin, for example. As shown in FIG. 9, the front-side pin member 54 comprises a body portion 54a, a head portion 54b, and a clip portion 54c. The front-side pin member 54 is fixed to a fixation portion 36d (see FIG. 8) of the bumper supporting member 36 by the clip portion 54c. As shown in FIG. 10, the U-shaped lip member 58 (recessed portion 58b) engages with the body portion 54a of the front-side pin member 54.

Next, the rear-side pin member 56 is a member having the strength which is large enough to transmit the collision load to the U-shaped clip member 58 when the connecting member 34 receives the collision load. That is, the rear-side pin member 56 is made of the steel, the stainless steel, or the high-strength resin, for example. As shown in FIG. 9, the rear-side pin member 56 comprises a body portion 56a with which the U-shaped clip member 58 engages, a head portion 56b, and a clip portion 56c. The rear-side pin member 56 is fixed to a fixation portion 34h of the connecting member 34 by the clip portion 56c.

In the embodiment of the present invention, as shown in FIG. 9, the front-side pin member 54 is fixed to the bumper supporting member 36 such that a gap is formed between the head portion 54b and the U-shaped clip member 58. Further, the rear-side pin member 56 is fixed to the connecting member 34 such that a gap is formed between the head portion 56b and the U-shaped clip member 58. In the present embodiment, the slide allowing mechanism 52 is configured not to have the above-described bumper support function by the above-described gaps. That is, the slide allowing member 52 is configured to have the slide function independently from the support function (first support function) of the bumper 18 by means of the bumper supporting member 36. By this slide function, the slide allowing member 52 makes the connecting member 34 slide rearwardly relative to the bumper supporting member 36, thereby allowing the rearward move of the bumper 18.

Next, the U-shaped clip member 58 is a flat-plate shaped member which is made of the steel or the stainless steel and has a specified thickness, and arranged on the upper face 34c of the connecting member 34. As shown in FIG. 10, at the U-shaped clip member 58 are formed a fort-side recess portion 58b which engages with the body portion 54a of the front-side pin member 54, a rear-side recess portion 58a which engages with the body portion 56a of the rear-side pin member 56, a middle groove portion 58c which interconnects these recess portions 58a, 58b, and an opening groove portion 58d which is formed in front of the front-side recess portion 58b and opened at a front-end edge of the U-shaped clip member 58. Thus, the U-shaped clip member 58 is provided with a U-shaped groove portion which comprises the rear-side recess portion 58a, the middle groove portion 58c, the front-side recess portion 58b, and the opening groove portion 58d which extend continuously in order from a rear end portion 58e to a front end portion 58f. The U-shaped clip member 58 is plane-symmetrical relative to its central axial line (not illustrated) in the plan view as shown in FIG. 10.

The embodiment of the present invention is configured as described above such that when the collision with the load having the specified magnitude or larger occurs, the connecting member 34 is made to slide rearwardly relative to the bumper supporting member 36 by the slide allowing mechanism 52, whereby the collision impact is reduced. As shown in FIGS. 5, 6 and 8, at the upper face 36a of the bumper supporting member 36 is provided a guide rib (guide portion) 36e to guide this rearward slide of the connecting member 34.

Further, the embodiment of the present invention is configured such that after the connecting member 34 slides rearwardly relative to the bumper supporting member 36 by a specified distance, contacting/engaging of the above-described restriction portions 48, 50/supporting members 36b, 36c with the upper face 34c of the connecting member 34 are released. That is, as shown in FIGS. 4 through 7, no rib is formed in an area of the upper face 34c of the connecting member 34 which is located on the vehicle forward side of a position where the supporting members 36b, 36c contact/engage with the upper face 34c and this area is configured to be of a flat-plate shape, so that rearward sliding of the connecting member 34 is not restricted (i.e., allowed).

Further, as shown in FIGS. 4 through 6 and 8, a slant guide portion (slant portion) 36f which is configured to contact the connecting member 34 when the connecting member 34 slides rearwardly by a specified distance is provided at the upper face 36a of the bumper supporting member 36. The present embodiment is configured such that contacting of the connecting member 34 with the bumper supporting member 36, more specifically, contacting of the connecting member 34 with the restricting members/supporting members 36b, 36c is prevented in the sliding and the connecting member 34 contacts the slant guide portion 36f and then slides obliquely upwardly in a side view in order to secure the sufficient sliding of the connecting member 34 (see FIG. 12).

Figure 11:
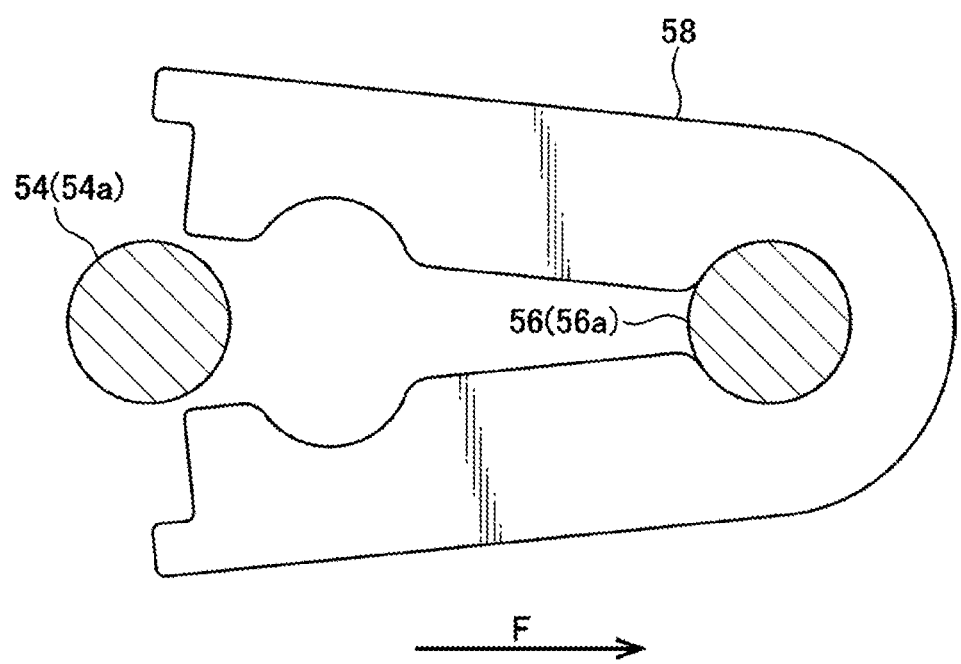
FIG. 11 is a view showing a deformation state of the flat-plate shaped clip member when engaging is released in the slide allowing mechanism according to the present embodiment.
Figure 12A:
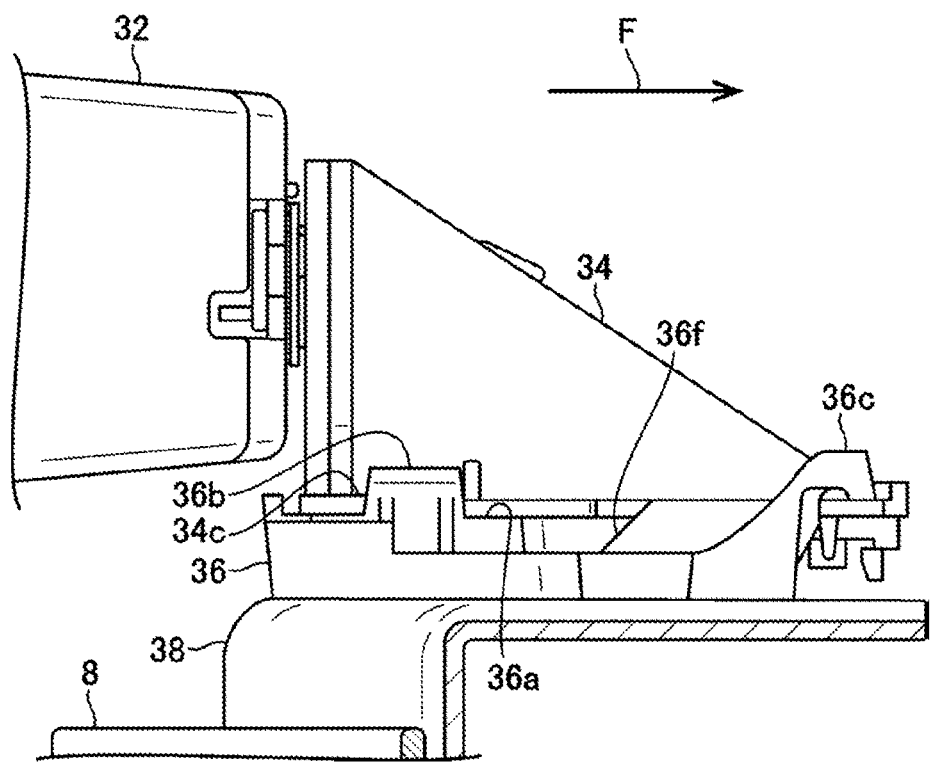
FIG. 12A is a side view showing a normal state where the connecting member is fixed to the bumper supporting member in the bumper support structure according to the present embodiment, when viewed from the vehicle left side.
Figure 12B:
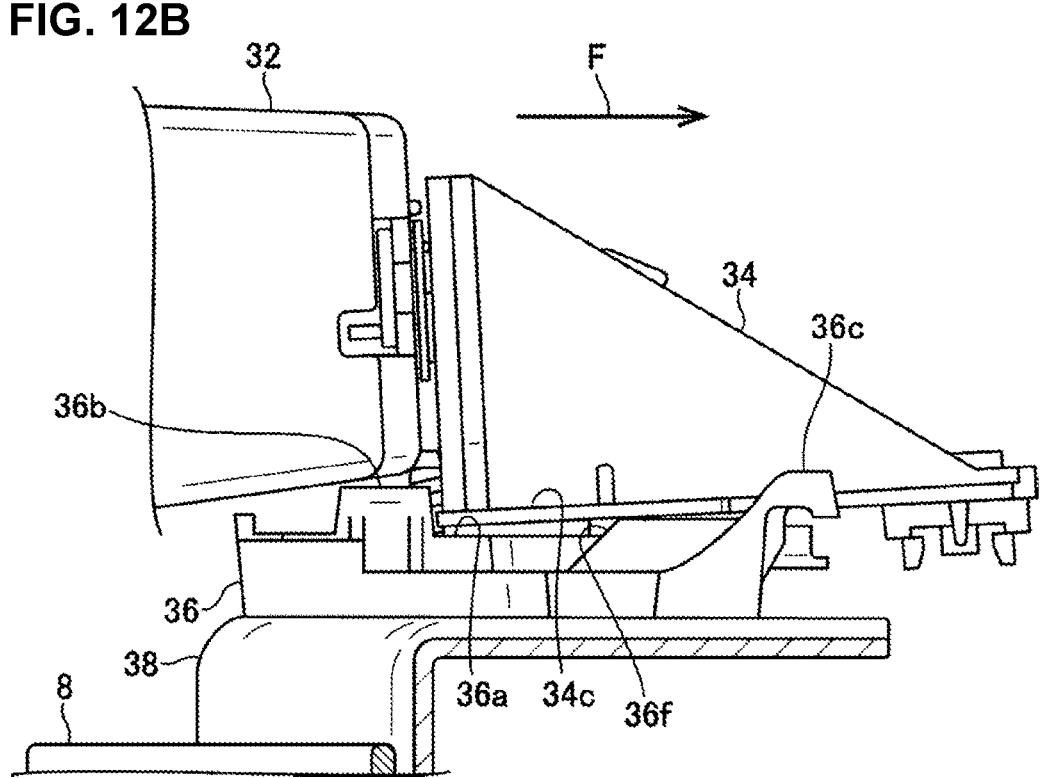
FIG. 12B is a side view showing a collision state where the connecting member slides relative to the bumper supporting member by a specified distance in the bumper support structure according to the present embodiment, when viewed from the vehicle left side.

Next, as shown in FIGS. 10, 11, 12A and 12B, the dimension and strength of the U-shaped clip member 58 of the slide allowing mechanism 52, the engagement of the U-shaped clip member 58 with the front-side pin member 54 and the rear-side pin member 56 in a normal state (non-collision), and the deformation of the U-shaped clip member 58 in the collision and engagement releasing caused by this deformation will be described. FIG. 10 is a plan view primarily explaining a positional relationship and a dimensional relationship between a flat-plate shaped clip member and pin members of the slide allowing mechanism according to the present embodiment, FIG. 11 is a view showing a deformation state of the flat-plate shaped clip member when engaging is released in the slide allowing mechanism according to the present embodiment, FIG. 12A is a side view showing a normal state where the connecting member is fixed to the bumper supporting member in the bumper support structure according to the present embodiment, when viewed from the vehicle left side, and FIG. 12B is a side view showing a collision state where the connecting member slides relative to the bumper supporting member by a specified distance in the bumper support structure according to the present embodiment, when viewed from the vehicle left side.

According to the embodiment of the present invention, when the load having the specified magnitude or larger is applied to the bumper 18 rearwardly from the vehicle forward side in the collision, the rear-side pin member 56 which slides rearwardly together with the connecting member 34 gets away from the rear-side pin member 56 fixed to the bumper supporting member 36 and a relative distance between the pin members 54, 56 is increased. Thereby, the U-shaped clip member 58 is deformed and engaging of the U-shaped clip member 58 with the font-side pin member 54 is released (see FIG. 11). The U-shaped clip member 58, the front-side pin member 54 and the rear-side pin member 56 are configured as described below so as to perform the above-described functions.

First, a relationship between a force applied to the U-shaped clip member 58 and deformation caused by this force will be described. In an initial state of the collision, the body portion 56a of the rear-side pin member 56 which starts to move rearwardly pushes the U-shaped clip member 58 rearwardly via the rear-side recess portion 58b of the U-shaped clip member 58. Herein, a rear face of the rear-side recess portion 58b which the rear-side pin member 56 contacts can be considered as a support point and a force point when the U-shaped clip member 58 is deformed. Meanwhile, the front-side recess portion 58b with which the body portion 54a of the front-side pin member 54 engages can be considered as a working (act) point of a force of the moment which expands the U-shaped clip member 58 laterally (in the vehicle width direction).

Next, the primary determination criteria to set the respective dimensions A-E shown in FIG. 10 will be described. When the relative distance D between the front-side pin member 54 and the rear-side pin member 56 of the U-shaped clip member 58 is set to be larger, the distance between the above-described support point and the above-described working point becomes larger, and therefore the above-described moment force becomes greater as well. Accordingly, the larger the relative distance D is, the more easily the U-shaped clip member 58 is deformed, so that engaging of the U-shaped clip member 58 with the front-side pin member 54 is more easily released (see FIG. 11). Meanwhile, when the relative distance D is set to be too large, the U-shaped clip member 58 comes to be deformed easily in such a manner that it is twisted in its thickness direction (in the vehicle vertical direction), so that a sliding load (a load which starts to cause sliding by the collision/ a load to release the engaging) of the connecting member 34 becomes unstable. For example, while it is preferable that the relative distance D be 40 mm or smaller, this distance can be set appropriately depending on a vehicle type to which the slide allowing mechanism 52 is applied.

If the plate thickness of the U-shaped clip member 58 is large, it is difficult to deform the U-shaped clip member 58. However, it becomes easier to deform the U-shaped clip member 58 which has the thin plate thickness. Accordingly, it may be preferable that this plate thickness be 0.8-2.0 mm in order to stabilize the sliding load, but the plate thickness can be set appropriately according to the type of vehicle to which the slide allowing mechanism 52 is applied regardless of these numbers.

A target sliding load can be obtained primarily by setting the dimension of the above-described relative distance D first and then respectively adjusting a width B of the opening groove portion 58d formed at the U-shaped clip member 58 and the dimension of a diameter E1 of the front-side pin member 54. Further, in the U-shaped clip member 58, a diameter E2 of the rear-side pin member 56, a distance C between a rear face of the rear-side recess portion 58a and the rear end portion 58e, and a curvature A of a corner portion between the opening groove portion 58d and the front-side recess portion 58b are also set appropriately because these affect easiness/difficulty of the deformation of the U-shaped clip member 58. For example, it may be preferable that the diameter E2 and the diameter Ee be the same, the distance C be 5-9 mm, and the curvature A be R1-R3 mm, but these can be set appropriately according to the type of vehicle to which the slide allowing mechanism 52 is applied regardless of these numbers.

Hereafter, operations of the slide allowing mechanism 52 will be described. In the embodiment of the present invention, when the load having the specified magnitude or larger is inputted to the bumper 18 from the vehicle forward side in the collision and thereby the sliding load having the specified magnitude (the load which starts to cause sliding by the collision/ the load to release the engaging) is transmitted to the connecting member 34 via the bumper 18 and the bumper fixing member 32, the connecting member 34 starts to slide in the vehicle rearward direction shown by an arrow F in FIGS. 11 and 12B by receiving the sliding load first. Herein, in a case where this sliding load is smaller than a desired magnitude, the connecting member 34 does not slide because of the engaging of the U-shaped clip member 58 with the front-side pin member 54 and the rear-side pin member 56.

After this, as the sliding amount (quantity) of the connecting member 34 increases, the rear-side pin member 56 moves rearwardly and also the U-shaped clip member 58 which receives the force from this rear-side pin member 56 moves rearwardly as well. Meanwhile, since the front-side pin member 54 does not move, the U-shaped clip member 58 is deformed as shown in FIG. 11 and its engaging with the front-side pin member 54 is released.

As shown in FIG. 12A, the connecting member 34 slides on the upper face 36a of the bumper supporting member 36 by a specified distance from its initial position in the collision. Then, as shown in FIG. 12B, after its specified-distance rearward sliding, the connecting member 34 contacts the above-described slant guide portion 36f and gets away from the upper face 36a. Further, as shown in FIG. 12B, at this position, contacting/engaging of the restricting members 36b, 36c of the bumper supporting members 36 with the upper face 34c of the connecting member 34 are released. Thereby, contacting of the connecting member 34 with the restricting members/supporting members 35b, 36c is prevented, so that the sliding amount (quantity) of the connecting member 34 is secured. After this, the collision impact transmitted via the bumper reinforcement 8 which receives the collision load from the bumper 18 is absorbed at the crash cans 6.

Herein, as a modification, the slide allowing mechanism 52 may be configured such that the front-side pin member (54) is fixed to the bumper supporting member (36), the rear-side pin member (56) is fixed to the connecting member (34), the U-shaped clip member (58) is provided such that it is opened rearwardly, and when the front vehicle collision occurs, U-shaped clip member (58) does not slide but the rear-side pin member (56) slides rearwardly together with the connecting member (34) so as to deform the U-shaped clip member (58), whereby the engaging of the U-shaped clip member (58) with the rear-side pin member (56) is released.

Next, operations/effects of the vehicle-body structure of the vehicle according to the embodiment of the present invention will be described. Since the present vehicle-body structure comprises the bumper support portion 36 (38) provided at the vehicle body of the vehicle 1 to support the bumper 18, the connection portion 34 (32) connecting the bumper 18 and the bumper support portion 36 and supporting the bumper 18, and the slide allowance portion 52 configured to allow the bumper 18 to slide in the vehicle longitudinal direction relative to the bumper support portion 36 when the longitudinal load having the specified magnitude or larger is applied to the bumper 18 from the vehicle outside, wherein the connection portion 34 is provided on the upper face 36a of the bumper support portion 36, and the slide allowance portion 52 is configured to allow the longitudinal sliding of the bumper 18 independently from the supporting of the bumper 18 by the connection portion 34, the support rigidity of the bumper 18 can be increased by supporting the bumper 18 at the upper face 36a of the bumper support portion 36. Moreover, the bumper 18 can be made to slide in the vehicle longitudinal direction in the collision without improperly affecting the bumper support rigidity by allowing the longitudinal sliding of the bumper 18 independently from the supporting of the bumper 18 by the connection portion 34. Thus, the present vehicle-body structure can compatibly attain the support rigidity of the bumper 18 and the impact reduction performance for the pedestrian in the collision.

Further, according to the embodiment of the present invention, since the slide allowance portion 52 comprises the clip member 58 which is capable of sliding in the vehicle longitudinal direction together width the connection portion 34 and the pin member 54 which is fixed to the bumper support portion 36 so as to engage with the clip member 58, and the clip member 58 is configured such that when the longitudinal load having the specified magnitude or larger is applied to the bumper 18 from the vehicle outside, the engaging of the clip member 58 with the pin member 54 fixed to the bumper support portion 36 is released according to the sliding of the connection portion 34, the bumper 18 can be made to slide in the vehicle longitudinal direction more securely when the longitudinal load having the specified magnitude or larger is applied.

Moreover, according to the embodiment of the present invention, the connection portion 34 is capable of sliding rearwardly or forwardly along the upper face 36a of the bumper support portion 36, the slide allowance portion 52 comprises the first pin member 56 which is fixed to the connection portion 34, the second pin member 54 which is fixed to the bumper support portion 36, and the U-shaped member 58 which has the groove portion 58a which is capable of engaging with the first pin member 56 and the second pin member 54, and the U-shaped member 58 is configured such that when the longitudinal load having the specified magnitude or larger is applied to the bumper 18 rearwardly from the vehicle outside, deformation of the U-shaped member 58 is caused by an increase of a relative distance between the first pin member 56 and the second pin member 54 according to the sliding of the connection portion 34, whereby the engaging of the U-shaped member 58 with the second pin member 54 is released. According to this embodiment, the impact reduction performance can be secured more properly by releasing the engaging of the U-shaped member 58 with the second pin member 54 fixed to the bumper support portion 36 by using the deformation of the U-shaped member 58 when the longitudinal load having the specified magnitude or larger is applied to the bumper 18 rearwardly from the vehicle outside.

Further, according to the embodiment of the present invention, since the second pin member 54 is fixed to the bumper support portion 36 on the vehicle forward side of the first pin member 56, the groove portion 58e of the U-shaped member 58 is opened to the vehicle forward side, the U-shaped member 58 is configured such that when the longitudinal load having the specified magnitude or larger is applied to the bumper 18 rearwardly from the vehicle outside, the U-shaped member 58 is forced to slide rearwardly by receiving the force from the first pin member 56 and deformed so as to be expanded by receiving the force from the second pin member 54 according to the sliding of the connection portion 34, the releasing of the engaging of the U-shaped member 58 with the second pin member 54 by using the deformation of the U-shaped member 58 can be attained more effectively.

Moreover, according to the embodiment of the present invention, since the restriction portions 36b, 26c to restrict the forward move and the lateral move, in the vehicle width direction, of the connection portion 34 are provided at the upper face 36a of the bumper support portion 36, the bumper 18 can be prevented from being displaced forwardly or laterally by the restriction portions 36b, 26c in the normal time (except the collision), so that the support rigidity of the bumper 18 can be secured properly. Meanwhile, in the collision, the bumper can be prevented from being moved in another direction than the rearward direction.

Further, according to the embodiment of the present invention, since the slant portion 36f which is configured to protrude obliquely upwardly toward the vehicle rearward side and contact the connection portion 34 when the connection portion 34 slides rearwardly by the specified distance is provided at the upper face 36a of the bumper support portion 36, the connection portion 34 can be made to slide obliquely upwardly after the connection portion 34 slides along the upper face 36a of the bumper support portion 36 by the specified distance in the collision, so that the contacting of the connection portion 34 with the restriction portions 36b, 36c is prevented and the sliding distance of the connection portion 34 is secured, thereby reducing the collision impact more properly.

Moreover, according to the embodiment of the present invention, since the bumper support portion 36 is located at the position which is upwardly spaced apart from the crash can 6, the support rigidity of the bumper 18 can be secured without hindering deformation of the crash can 6 in the collision. Further, the support rigidity of the bumper 18 can be secured without hindering air introduction from the front grille 24 provided at the front bumper 18. Moreover, according to the present embodiment, the vehicle 1 further comprises the bracket 38 to fix the bumper support portion 36 to the bumper reinforcement 8, and the bumper support portion 36 is provided via the bracket 38 so as to be located at the position which is upwardly spaced apart from the crash can 6.

Additionally, according to the embodiment of the present invention, since the bumper support portion 36 is provided with the guide portion 36e which is configured to extend in the vehicle longitudinal direction and guide the rearward sliding of the connection portion 34, the bumper 18 can be made to slide rearwardly more securely in the collision.

What is claimed is:

1. A vehicle-body structure of a vehicle, comprising:
   a bumper provided at a front face and/or a rear face of the vehicle;
   a bumper support portion provided at a vehicle body of the vehicle to support the bumper;
   a connection portion connecting the bumper and the bumper support portion and supporting the bumper; and
   a slide allowance portion configured to allow the bumper to slide in a vehicle longitudinal direction relative to the bumper support portion when a longitudinal load having a specified magnitude or larger is applied to the bumper from a vehicle outside,
   wherein said connection portion is provided on an upper face of said bumper support portion,
   wherein the support provided by the bumper support portion and the slide allowed by the slide allowance portion are separately provided, and
   wherein said connection portion is capable of sliding in the vehicle longitudinal direction relative to said bumper support portion, said slide allowance portion comprises a clip member which is capable of sliding in the vehicle longitudinal direction together width the connection portion and a pin member which is fixed to said bumper support portion so as to engage with said clip member, and said clip member is configured such that when the longitudinal load having the specified magnitude or larger is applied to the bumper from the vehicle outside, said engaging of the clip member with the pin member fixed to the bumper support portion is released according to the sliding of said connection portion.

2. The vehicle-body structure of the vehicle of claim 1, wherein said connection portion is capable of sliding rearwardly or forwardly along the upper face of said bumper support portion, said slide allowance portion comprises a first pin member which is fixed to the connection portion, a second pin member which is fixed to the bumper support portion, and a U-shaped member which has a groove portion capable of engaging with said first pin member and said second pin member, and said U-shaped member is configured such that when the longitudinal load having the specified magnitude or larger is applied to the bumper rearwardly or forwardly from the vehicle outside, deformation of the U-shaped member is caused by an increase of a relative distance between said first pin member and said second pin member according to said sliding of the connection portion, whereby said engaging of the U-shaped member with the second pin member is released.

3. The vehicle-body structure of the vehicle of claim 2, wherein said second pin member is fixed to said bumper support portion on a vehicle forward side of said first pin member, the groove portion of said U-shaped member is opened to the vehicle forward side, said U-shaped member is configured such that when the longitudinal load having the specified magnitude or larger is applied to the bumper rearwardly from the vehicle outside, the U-shaped member is forced to slide rearwardly by receiving a force from said first pin member and deformed so as to be expanded by receiving a force from said second pin member according to said sliding of the connection portion.

4. The vehicle-body structure of the vehicle of claim 3, wherein a restriction portion to restrict a forward move and a lateral move, in a vehicle width direction, of said connection portion is provided on the upper face of said bumper support portion.

5. The vehicle-body structure of the vehicle of claim 4, wherein a slant portion which is configured to protrude obliquely upwardly toward a vehicle rearward side and contact said connection portion when the connection portion slides rearwardly by a specified distance is provided at the upper face of said bumper support portion.

6. The vehicle-body structure of the vehicle of claim 5, wherein the vehicle comprises a crash can which is provided at a tip portion of a front side frame and a bumper reinforcement which is connected to said crash can, and said bumper support portion is located at a position which is upwardly spaced apart from said crash can.

7. The vehicle-body structure of the vehicle of claim 6, wherein the vehicle further comprises a bracket to fix said bumper support portion to said bumper reinforcement, and said bumper support portion is provided via said bracket so as to be located at said position which is upwardly spaced apart from the crash can.

8. The vehicle-body structure of the vehicle of claim 7, wherein said bumper support portion is provided with a guide portion which is configured to extend in the vehicle longitudinal direction and guide rearward sliding of said connection portion.

9. The vehicle-body structure of the vehicle of claim 1, wherein a restriction portion to restrict a forward move and a lateral move, in a vehicle width direction, of said connection portion is provided on the upper face of said bumper support portion.

10. A vehicle-body structure of a vehicle, comprising:
    a bumper provided at a front face and/or a rear face of the vehicle;
    a bumper support portion provided at a vehicle body of the vehicle to support the bumper;
    a connection portion connecting the bumper and the bumper support portion and supporting the bumper; and
    a slide allowance portion configured to allow the bumper to slide in a vehicle longitudinal direction relative to the bumper support portion when a longitudinal load having a specified magnitude or larger is applied to the bumper from a vehicle outside,
    wherein said connection portion is provided on an upper face of said bumper support portion,
    wherein the support provided by the bumper support portion and the slide allowed by the slide allowance portion are separately provided, and
    wherein a slant portion which is configured to protrude obliquely upwardly toward a vehicle rearward side and contact said connection portion when the connection portion slides rearwardly by a specified distance is provided at the upper face of said bumper support portion.

11. A vehicle-body structure of a vehicle, comprising:
a bumper provided at a front face and/or a rear face of the vehicle;
a bumper support portion provided at a vehicle body of the vehicle to support the bumper;
a connection portion connecting the bumper and the bumper support portion and supporting the bumper; and
a slide allowance portion configured to allow the bumper to slide in a vehicle longitudinal direction relative to the bumper support portion when a longitudinal load having a specified magnitude or larger is applied to the bumper from a vehicle outside,
wherein said connection portion is provided on an upper face of said bumper support portion,
wherein the support provided by the bumper support portion and the slide allowed by the slide allowance portion are separately provided, and
wherein the vehicle comprises a crash can which is provided at a tip portion of a front side frame and a bumper reinforcement which is connected to said crash can, and said bumper support portion is located at a position which is upwardly spaced apart from said crash can.

12. The vehicle-body structure of the vehicle of claim 1, wherein said bumper support portion is provided with a guide portion which is configured to extend in the vehicle longitudinal direction and guide rearward sliding of said connection portion.

13. The vehicle-body structure of the vehicle of claim 1, wherein a restriction portion to restrict a forward move and a lateral move, in a vehicle width direction, of said connection portion is provided on the upper face of said bumper support portion.

14. The vehicle-body structure of the vehicle of claim 1, wherein a slant portion which is configured to protrude obliquely upwardly toward a vehicle rearward side and contact said connection portion when the connection portion slides rearwardly by a specified distance is provided at the upper face of said bumper support portion.

15. The vehicle-body structure of the vehicle of claim 1, wherein the vehicle comprises a crash can which is provided at a tip portion of a front side frame and a bumper reinforcement which is connected to said crash can, and said bumper support portion is located at a position which is upwardly spaced apart from said crash can.

16. The vehicle-body structure of the vehicle of claim 1, wherein said bumper support portion is provided with a guide portion which is configured to extend in the vehicle longitudinal direction and guide rearward sliding of said connection portion.

17. The vehicle-body structure of the vehicle of claim 2, wherein a restriction portion to restrict a forward move and a lateral move, in a vehicle width direction, of said connection portion is provided on the upper face of said bumper support portion.

18. The vehicle-body structure of the vehicle of claim 2, wherein a slant portion which is configured to protrude obliquely upwardly toward a vehicle rearward side and contact said connection portion when the connection portion slides rearwardly by a specified distance is provided at the upper face of said bumper support portion.

19. The vehicle-body structure of the vehicle of claim 2, wherein the vehicle comprises a crash can which is provided at a tip portion of a front side frame and a bumper reinforcement which is connected to said crash can, and said bumper support portion is located at a position which is upwardly spaced apart from said crash can.

* * * * *